US012612024B2

(12) United States Patent
Janson et al.

(10) Patent No.: US 12,612,024 B2
(45) Date of Patent: Apr. 28, 2026

(54) CONNECTION FOR BRAKE SYSTEM HOUSING

(71) Applicant: ZF Active Safety US Inc., Livonia, MI (US)

(72) Inventors: Marcus Janson, Koblenz (DE);
Nicholas Alford, Waldesch (DE);
Blaise Ganzel, Livonia, MI (US);
Markus Mallmann, Pfalzfeld (DE)

(73) Assignees: ZF ACTIVE SAFETY US INC.,
Livonia, MI (US); **ZF ACTIVE
SAFETY GMBH**, Koblenz (DE)

( * ) Notice: Subject to any disclaimer, the term of this patent is extended or adjusted under 35 U.S.C. 154(b) by 919 days.

(21) Appl. No.: 17/526,042

(22) Filed: Nov. 15, 2021

(65) Prior Publication Data

US 2023/0150473 A1 May 18, 2023

(51) Int. Cl.
| | |
|---|---|
| *B60T 17/06* | (2006.01) |
| *B60T 11/22* | (2006.01) |
| *B60T 11/26* | (2006.01) |
| *F16J 15/3236* | (2016.01) |

(52) U.S. Cl.
CPC .............. *B60T 17/06* (2013.01); *B60T 11/22* (2013.01); *B60T 11/26* (2013.01); *F16J 15/3236* (2013.01); *B60Y 2400/81* (2013.01)

(58) Field of Classification Search
CPC ...... B60T 11/22; B60T 11/232; B60T 11/236; B60T 11/26; B60T 17/06; B60T 11/16; B60T 11/224; B60T 11/28; B60T 13/142; B60T 17/222; B60Y 2400/81; F16J 15/106; F16J 15/3236

USPC ....................................................... 303/113.5
See application file for complete search history.

(56) References Cited

U.S. PATENT DOCUMENTS

| | | | |
|---|---|---|---|
| 2010/0212313 A1* | 8/2010 | Aoki ..................... | B60T 11/236 60/533 |
| 2015/0175142 A1* | 6/2015 | Lopez-Larequi ..... | B60T 13/142 60/533 |
| 2016/0052497 A1 | 2/2016 | Krebs et al. | |
| 2017/0217414 A1 | 8/2017 | Krebs et al. | |
| 2017/0369045 A1 | 12/2017 | Charpentier et al. | |

(Continued)

FOREIGN PATENT DOCUMENTS

| | | |
|---|---|---|
| DE | 10108610 A1 | 9/2002 |
| DE | 102004004574 A1 | 9/2004 |

(Continued)

OTHER PUBLICATIONS

English machined translation of DE-102018205375 Oct. 10, 2019.*

(Continued)

*Primary Examiner* — Robert A. Siconolfi
*Assistant Examiner* — San M Aung
(74) *Attorney, Agent, or Firm* — Tarolli, Sundheim, Covell & Tummino LLP

(57) ABSTRACT

A connection for delivering fluid to a brake system housing having a cavity includes a fluid reservoir having a port extending along a centerline and configured to be received in the cavity. A collar extends around the port. A grommet extends around the port and is received in the cavity for forming a fluid-tight seal between the port and the brake system housing. The grommet includes a flange extending radially to an outermost surface positioned radially inside the collar.

12 Claims, 3 Drawing Sheets

(56)     References Cited

U.S. PATENT DOCUMENTS

2018/0072294 A1      3/2018  Gerber et al.
2020/0189540 A1 *   6/2020  Wuest ..................... B60T 11/16

FOREIGN PATENT DOCUMENTS

DE        112016003196  T5      4/2018
DE        102018205375  A1 *  10/2019   ............. B60T 11/22
EP              2216220  A1 *    8/2010   ............. B60T 11/26
JP          H0612243  U    *    2/1994
JP          HO667243  U          9/1994
WO      WO-2004094208  A1 *  11/2004   ........... B60T 11/232

OTHER PUBLICATIONS

German Search Report corresponding to Application No.
102022212075.2 dated May 9, 2023. English translation not pro-
vided.

* cited by examiner

CONNECTION FOR BRAKE SYSTEM HOUSING

TECHNICAL FIELD

The present invention relates generally to braking systems and, in particular, relates to a connection for coupling a fluid reservoir to a brake system housing.

BACKGROUND

Currently, brake system master cylinders are equipped with a brake fluid reservoir installed on one or both of the master cylinder's supply fittings, depending on whether the master cylinder is simple or tandem. The brake fluid in the brake fluid reservoir is discharged during the braking and electronic stability program (ESP) system operation phase passes freely from the reservoir into the chamber or chambers of the master cylinder. It is desirable to prevent leakage of brake fluid from the master cylinder-fluid reservoir interface during braking, filling, and leak testing operations.

SUMMARY

In one example, a connection for delivering fluid to a brake system housing having a cavity includes a fluid reservoir having a port extending along a centerline and configured to be received in the cavity. A collar extends around the port. A grommet extends around the port and is received in the cavity for forming a fluid-tight seal between the port and the brake system housing. The grommet includes a flange extending radially to an outermost surface positioned radially inside the collar.

In another example, a connection for delivering fluid to a brake system housing having a cavity includes a fluid reservoir including a port extending along a centerline and configured to be received in the cavity. A collar encircles the port. An elastically deformable grommet extends around the port and is received in the cavity for forming a fluid-tight seal between the port and the brake system housing. The grommet includes a flange extending radially to an outermost surface positioned radially inside the collar.

Other objects and advantages and a fuller understanding of the invention will be had from the following detailed description and the accompanying drawings.

DETAILED DESCRIPTION

Figure 1:
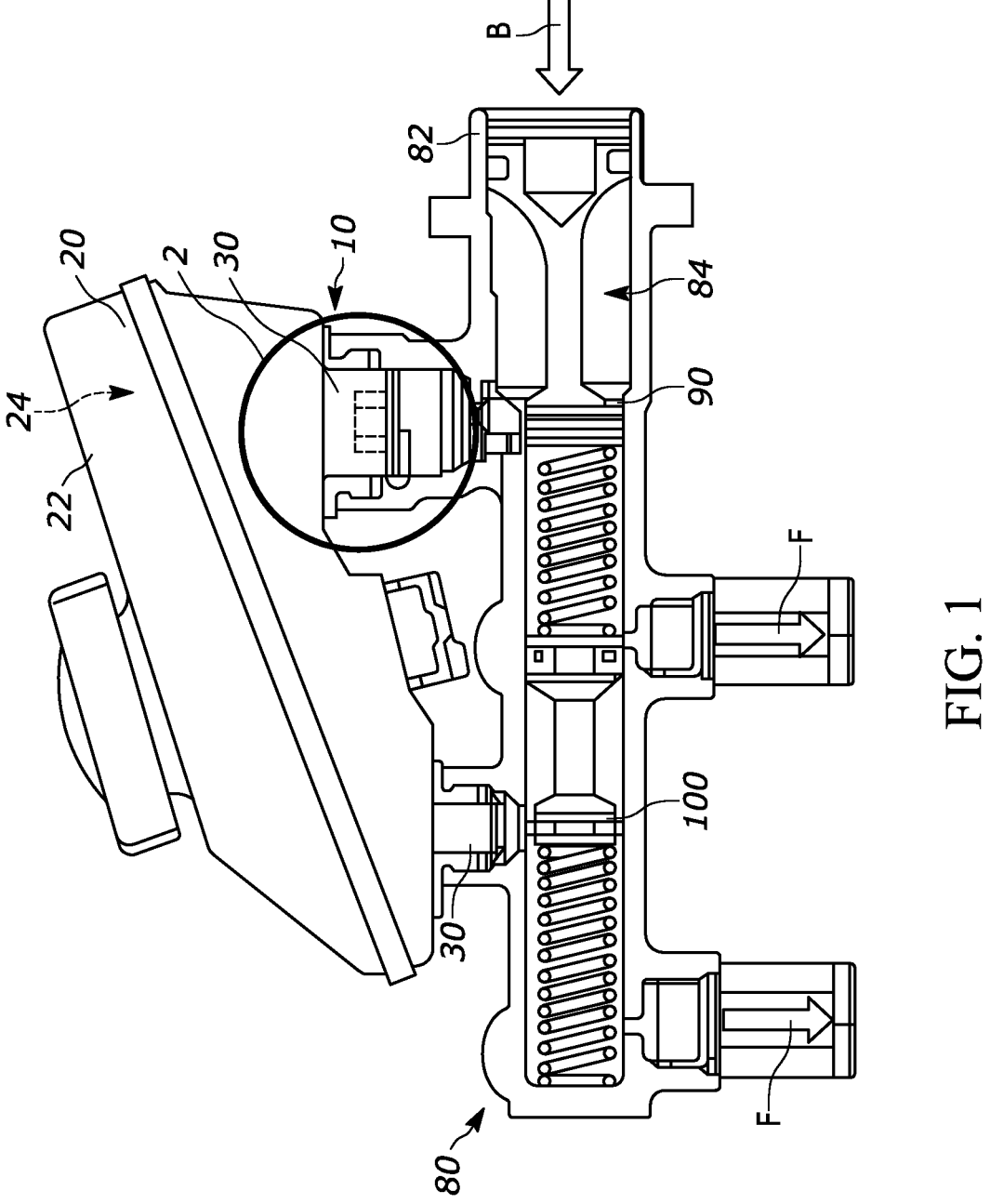
FIG. 1 is a schematic illustration of a portion of an example braking system including a fluid connection in accordance with the present invention.
Figure 2:
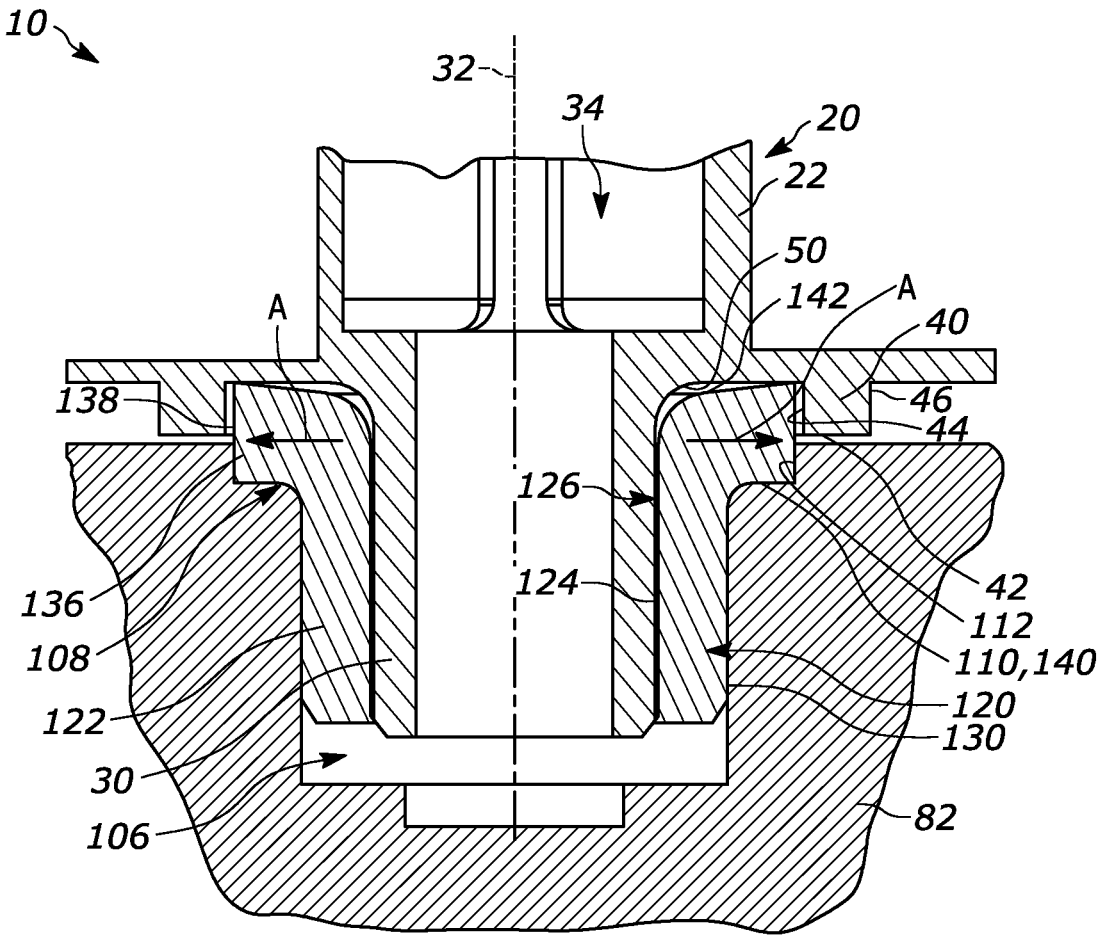
FIG. 2 is an enlarged view of a portion of FIG. 1.
Figure 3:
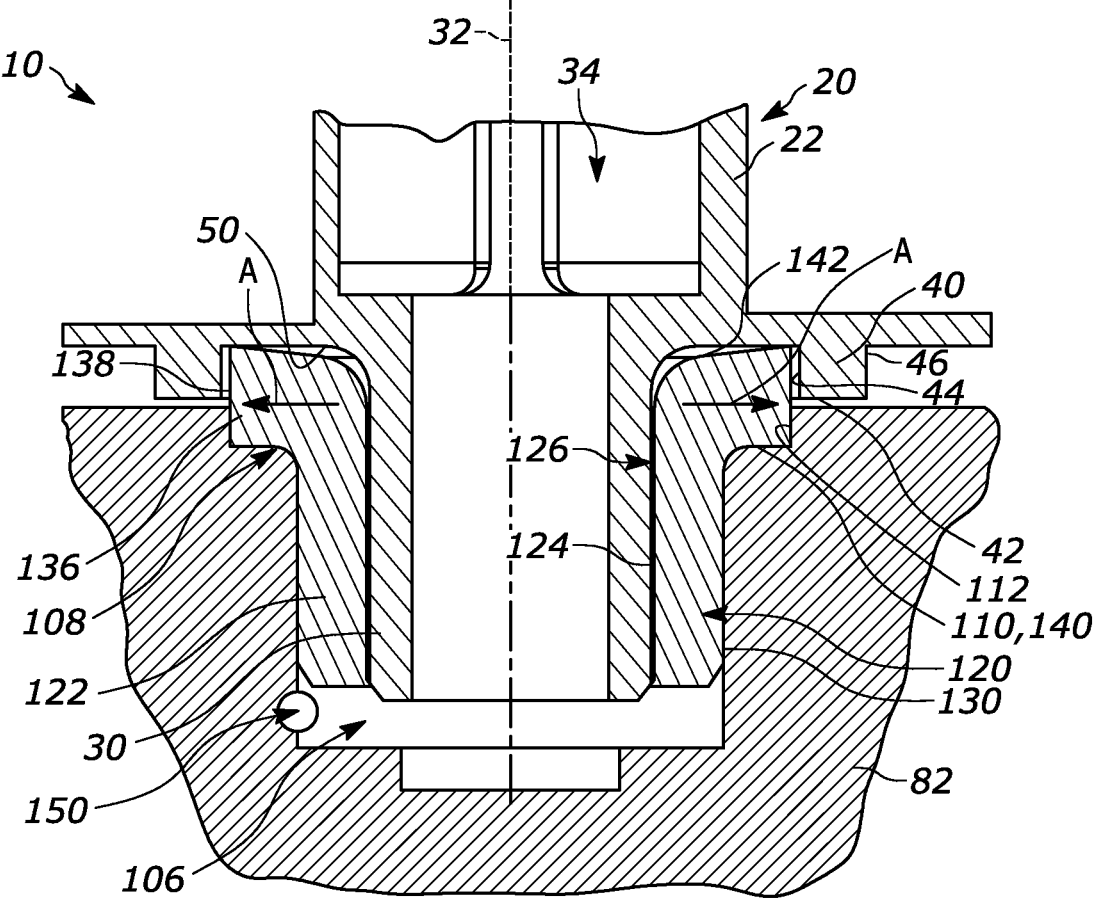
FIG. 3 is an enlarged, modified view of a portion of FIG. 1.

The present invention relates generally to braking systems and, in particular, relates to a connection for coupling a fluid reservoir to a brake system housing. FIGS. 1-3 illustrate an example fluid connection 10 in accordance with the present invention. Referring to FIG. 1, the connection 10 helps to fluidly couple a fluid reservoir 20 to a brake system 80.

In this example, the brake system 80 is a master cylinder assembly that pressurizes brake fluid for delivery to brakes associated with vehicle wheels (not shown) in the manner generally indicated by the arrows F. The brake system, however, could alternatively be an integrated, electrohydraulic brake apply control unit (not shown) or any other brake system needing fluid connection to a brake fluid reservoir 20. In any case, the fluid reservoir 20 includes a housing 22 defining a chamber 24 for storing brake fluid.

The master cylinder assembly 80 includes a housing 82 defining a passage 84. Primary and secondary piston assemblies 90, 100 are provided in the passage 84 and cooperate to pressurize brake fluid from the reservoir 20 in a known manner. Ports 30 extending from the housing 22 help to fluidly connect the chamber 24 of pressurized fluid to the passage 84.

The fluid connection 10 couples the reservoir 20 to the master cylinder assembly 80 in a fluid-tight manner to help prevent leaking of pressurized brake fluid from the reservoir. Although the description of the connection 10 is limited to a single port 30 (the right or first port as shown in FIG. 1), it will be appreciated that the connection likewise applies to the other port (the left or second port shown in FIG. 1). In any case, the connection 10 includes the port 30.

Referring to FIG. 2, the port 30 extends from the housing 22 along a centerline 32 and defines a passage 34 in fluid communication with the chamber 24. A collar 40 also extends from a surface 50 of the housing 22 and around the port 30. In one example, the port 30 and collar 40 are circular and, thus, the collar can encircle and be concentric with the port. Other shapes for the port 30 and collar 40 are contemplated. Moreover, the collar 40 can constitute a continuous projection extending around the port 30 or multiple, spaced-apart projections that collectively extend around the port. In any case, the collar 40 includes an axial end surface 42, an inner surface 44, and an outer surface 46.

The housing 82 of the master cylinder assembly 80 includes a cavity 106 for receiving the port 30. The cavity 106 includes a recess or countersink 108 defined by an end surface 110 and an outer surface 112. The cavity 106 is in fluid communication with the passage 84 (not shown).

The connection 10 includes a grommet 120 for sealing the interface between the port 30 and the housing 82 within the cavity 106. The grommet 120 is tubular and includes a sidewall 122 having an inner surface 124 defining a passage 126. The passage 126 can receive a fluid control valve (not shown). The sidewall 122 can be cylindrical or conical. Regardless, the grommet 120 also includes an outer surface 130. The grommet 120 is made from an elastically deformable material, such as rubber.

A flange 136 extends radially outward from the sidewall 122 and terminates at an outer surface 138. Consequently, the outer surface 138 defines the radially outermost surface of the flange 136. The flange 136 also includes opposing first and second end surfaces 140, 142. The second surface 142 is tapered such that the thickness of the flange 136 decreases in a direction extending towards the passage 126.

When the connection 10 is assembled, the grommet 120 is positioned within the cavity 106 such that the first end surface 140 of the flange 136 abuts the end surface 110 of the countersink 108. The outer surface 138 of the flange 136 is positioned adjacent to or abuts the outer surface 112 of the countersink 108. Consequently, the flange 136 and, thus, the grommet 120 is prevented from moving laterally (in the left-to-right direction shown) relative to the cavity 106. The second end surface 142 of the flange 136 is positioned outside the countersink 108.

The port 30 is inserted into the passage 126 of the grommet 120 such that the port engages the inner surface 124 of the sidewall 122 and the housing 22 abuts the second end surface 142 of the flange 136. The sidewall 122 therefore becomes sandwiched between the port 30 the housing 82. The flange 136 becomes sandwiched between the housings 22 and the end surface 110. This can result in compression/extrusion of the sidewall 122 and the flange 136.

At the same time, the collar 40 extends over and around the flange 136. More specifically, the inner surface 44 of the collar extends completely around, e.g., encircles, the outer surface 138 of the flange 136. The inner surface 44 can be radially spaced from the outer surface 138. The tapered shape of the end surface 142 of the flange reduces the force needed to compress the flange 136 during insertion of the port 30 into the cavity 106.

The grommet 120 helps to provide a fluid-tight seal between the housings 22, 82. More specifically, the compressed sidewall 122 provides a first sealing interface between the port 30 and the housing 82 in both the axial and circumferential directions. The flange 136 abuts both housings 22, 82 to provide a second sealing interface between the housing 22 and the housing 82. The tapered second end surface 142 advantageously helps to better seal the flange 136 with the housing 22 and collar 40.

The collar 40 can be in close proximity with the housing 82 sufficient to allow for some relative movement between the housings 22, 82, which is damped by the flange 136. The axial gap between the collar 40 and housing 82, however, is minimized to help prevent dirt and water from contacting the grommet 120 and/or entering the connection 10. It will be appreciated that the grommet 120 can be preassembled on the port 30 before inserting the port into the cavity 106. In this manner, the countersink 108 acts as an axial stop for the flange 136 during insertion of the port 30 into the cavity 106.

The collar 40 can also bottom out on the housing 82 during assembly to help prevent the port 30 from being inserted too far into the cavity 106 and/or damaging the grommet 120. In particular, inserting the port 30 into a grommet 120 already positioned in the cavity 106 could cause undesirable lengthening of the grommet due to sliding/frictional interface between the port 30 and the inner surface 124.

Brake fluid can flow through the central passage 34, through the cavity 106, and ultimately to the passage 84 of the master cylinder assembly 80. Brake fluid can also return to the reservoir 20 through one of the ports 30. During the filling process and the leak testing the fluid within the reservoir 20, the master cylinder assembly 80 and the connection is under high pressure. While the vehicle is moving the reservoir 20 and master cylinder assembly 80 undergo high vibrations.

With this in mind, the collar 40 acts to maintain the grommet 120 in a fixed and centered position within the cavity 106. The collar 40 also advantageously helps to prevent or mitigate vibration by acting as a damping member. To this end, the collar 40 and/or countersink 108 help to mitigate relative movement between the housings 22, 82 by interacting with the grommet 120.

When the housing 22 moves towards the housing 82, flange 136 is compressed between the surfaces 110. This can cause the flange 136 to extrude radially outward in the manner indicated generally at A. The collar 40, however, limits this radial expansion/extrusion and cooperates with the outer surface 138 to provide an additional sealing interface between the grommet 120 and housing 22. Consequently, the collar 40 and countersink 108 advantageously help maintain the grommet 120 centered along the centerline 32 while simultaneously allowing for controlled expansion of the flange 136 during filling and leak testing operations.

The collar 40 is also advantageous in that helps accommodate the flange 136 and thereby reduces the depth of the countersink 108 needed to retain the flange. Along those lines, it will be appreciated that the countersink 108 in the housing 80 can be omitted and the axial length of the collar 40 increased to fully accommodate the flange 136. In other words, the axial length of the inner surface 44 of the collar 40 can be increased to approximate or exceed the axial length of the outer surface 138 of the flange 136 (not shown). Such a modification helps to save space in the housing 80.

In another example shown in FIG. 3, a bore 150 extends transversely from the cavity 106 and is in fluid communication with the passage 84 in the master cylinder assembly 80. When the port 30 and grommet 120 are inserted into the cavity 106, the axial extent of the sidewall 122 of the grommet is spaced from the bore 150. In other words, the fully inserted port 30 and grommet 120 do not block the bore 150 or hinder flow therethrough. Additionally, the grommet 120 is prevented from becoming damaged due to pushing the grommet along edges of the bore 150. Preventing this blockage is due in part to the collar 40 being configured to abut the housing 82 before the grommet 120 bottoms out in the cavity 106. Another reason is that the collar 40 allows the depth of the countersink 108 to be reduced and thereby allows the port 30 and grommet 120 to extend a lesser depth into the cavity than if the collar were not present.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A connection for delivering fluid to a brake system housing having a cavity, comprising:
   a fluid reservoir having a port extending along a centerline and configured to be received in the cavity and a collar extending around the port; and
   a grommet extending around the port and received in the cavity for forming a fluid-tight seal between the port and the brake system housing, the grommet including a flange extending radially to an outermost surface positioned radially inside the collar and confronting both the collar and a countersink in the cavity.

2. The brake fluid connection of claim 1, wherein the collar encircles the port.

3. The brake fluid connection of claim 1, wherein the grommet is formed from an elastically deformable material.

4. The brake fluid connection of claim 1, wherein the flange includes a first end surface for engaging the brake system housing and a second end surface for engaging the reservoir.

5. The brake fluid connection of claim 4, wherein the second end surface is tapered.

6. The brake fluid connection of claim 1, wherein the flange is configured to extend out of the cavity.

7. The brake fluid connection of claim 1, wherein the grommet includes a sidewall extending axially within the cavity and the flange extends radially outward from the sidewall into the countersink in the cavity.

8. The brake fluid connection of claim 1, wherein the flange is configured to expand radially outward into engagement with an outer surface of the countersink and with the inner surface of the collar in response to fluid pressure within the grommet.

9. A connection for delivering fluid to a brake system housing having a cavity, comprising:

a fluid reservoir having a port extending along a centerline and configured to be received in the cavity and a collar encircling around the port; and an elastically deformable grommet extending around the port and received in the cavity for forming a fluid-tight seal between the port and the brake system housing, the grommet including a sidewall extending axially within the cavity; and a flange extending radially outward from the sidewall and into a countersink in the cavity and having an outermost surface positioned radially inside the collar and at least partially longitudinally aligned therewith.

10. The brake fluid connection of claim 9, wherein the flange includes a first end surface for engaging the brake system housing and a second end surface for engaging the reservoir.

11. The brake fluid connection of claim 10, wherein the second end surface is tapered.

12. The brake fluid connection of claim 9, wherein the flange is configured to expand radially outward into engagement with an outer surface of the countersink and with the inner surface of the collar in response to fluid pressure within the grommet.

\* \* \* \* \*